June 19, 1951     J. C. MONAHAN     2,557,835
SEAL
Filed Nov. 9, 1948
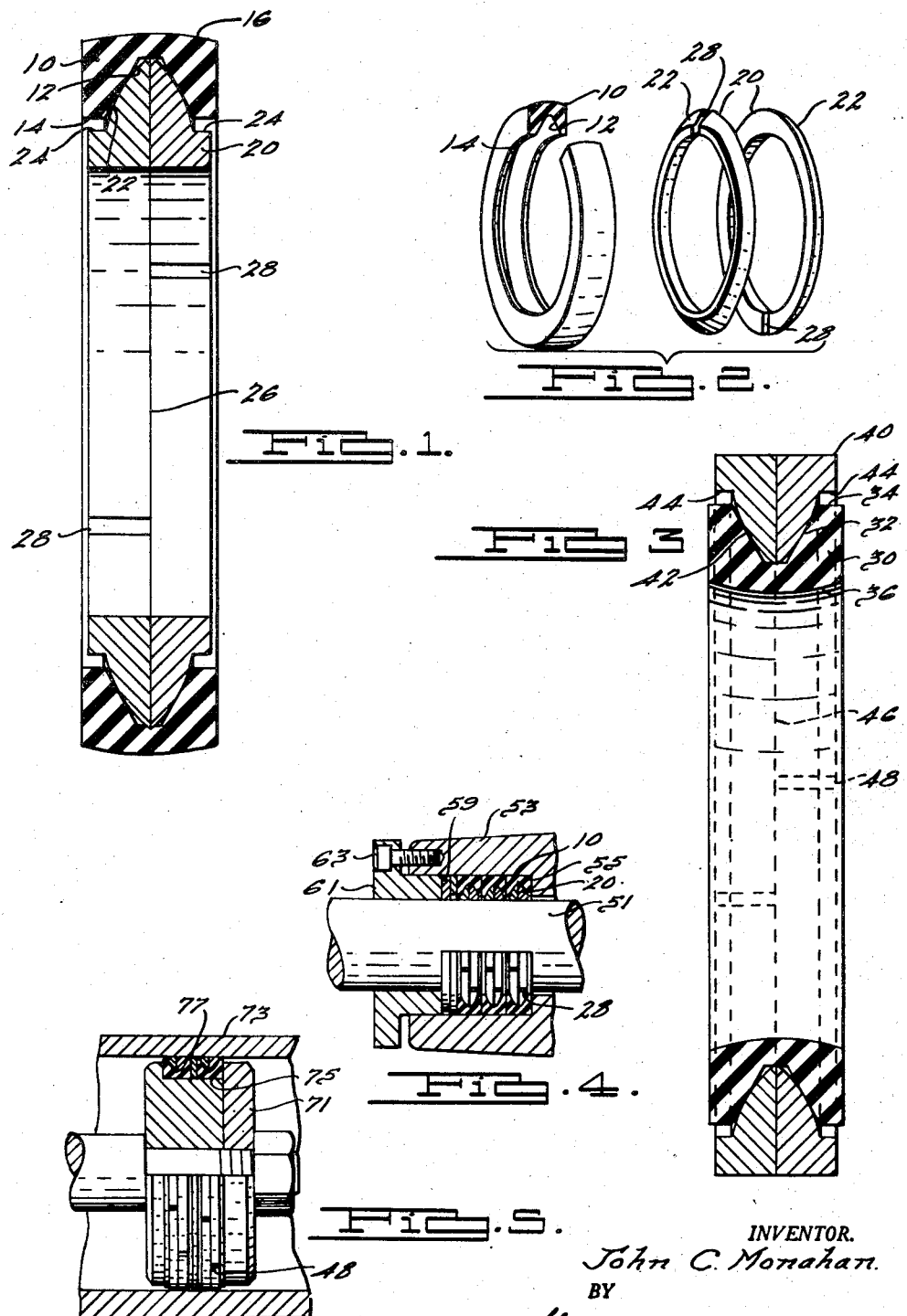
INVENTOR.
John C. Monahan.
BY
Harness, Dickey & Pierce
ATTORNEYS.

Patented June 19, 1951

2,557,835

UNITED STATES PATENT OFFICE 2,557,835

SEAL

John C. Monahan, Detroit, Mich.

Application November 9, 1948, Serial No. 59,065

2 Claims. (Cl. 288—19)

This invention relates to seals, and in particular refers to seals of the types known in the trade as rod packing, grooved piston packing, and packed piston packing.

Seals of the type herein described comprise, in brief, a pair of annular members which have mating peripheral sections. One member, which may be either the inner or the outer member, is made of deformable elastic material such as rubber and is referred to as a cushion-ring. The other member, called the sealing ring, has a periphery which is shaped in accordance with the principles of this invention to fit in a peripheral groove in the cushion ring. The sealing ring lies in juxtaposition to the moving part which is being sealed and is, therefore, constructed of a material which provides a suitable bearing surface.

A particular object of the invention is to provide a design for seal members of the type described which permits easy assembly of the seal and also elastic flow of the cushion ring so as to give a highly effective and fluid tight seal.

Another object is to provide means for limiting or confining the elastic flow of the cushion ring.

Other objects and features of the invention will appear in the description which follows the drawings in which:

Figure 1 is a cross section through a preferred form of a combined seal and support according to the present invention as adapted for a shaft or rod;

Fig. 2 is an exploded view of the parts shown in Fig. 1;

Fig. 3 is a cross section of the preferred form of the combined seal and support according to the present invention as adapted for a piston or plunger;

Fig. 4 is an assembly view with parts removed and partly in section showing the seal of Fig. 1 used as a rod packing, and installed in a housing having a shaft which may either reciprocate or rotate; and Fig. 5 is a sectional view with parts broken away showing the use of the ring of Fig. 3 as a grooved piston packing on a piston or plunger slidably mounted in a cylinder.

In Figs. 1 and 2, there is illustrated a preferred form of the invention, and it will be recognized that it is capable of both sealing and supporting shafts or rods. This form comprises an elastically deformable outer cushioning ring 10 having an internal groove 12 therein which opens into its inner periphery 14. This groove is preferably but not necessarily of substantially V-shape so that its width in any cylindrical section is inversely related to the radius.

The inner sealing ring 20 has an outer periphery 22 which fits in the groove 12. In unstressed assembly it is desirable that the peripheral portions 22 of the ring 20 occupy less than all of the cross sectional area of the groove 12, so as to permit some distortion of the cushion ring 10 when force is applied thereto. Hence, for the V groove 12 illustrated, a preferred shape of the portion 22 is bi-convex as illustrated.

It is desirable to have means for limiting the radial flow of the inner periphery 14 of the ring 10 when it is stressed. This may be conveniently accomplished by providing the ring 20 with annular shoulders 24 which are spaced slightly from or of a slightly smaller radius than the periphery 14 when the assembly is unstressed. In order to facilitate assembly the ring 20 may be transversely split as shown at 26 into two sections. It is also preferably split longitudinally as shown at 28 to provide for radial compression. Also to facilitate assembly, and further to provide means for applying maximum compression at the midplane of the seal assembly, the outer periphery 16 of the ring 10 may be made convex as illustrated.

The construction shown in Fig. 3 is the reverse of that described in connection with Figures 1 and 2, and is adapted for use on reciprocating members such as pistons or plungers. In this embodiment, the cushion ring 30 has an internal V groove 32 in its outer periphery 34. If desired, its inner periphery 36 may be convex. The sealing ring 40 has a bi-convex inner periphery 42 which mates with the groove 32. If desired, the ring 40 may be provided with flow limiting annular shoulders 44 and it may be transversely and longitudinally split, as shown at 46 and 48.

The cushoin rings 10 and 30 can be made of any suitable natural or synthetic material which deforms elastically under relatively low pressure, and preferably which has a reasonably high coefficient of friction with respect to the parts with which they are engaged to prevent slipping and a good resistance to the action of any corrosive fluids with which they may be in contact. Thus, for the majority of applications a natural or synthetic rubber, or like material, is satisfactory. The sealing rings 20 and 40 can be made of any suitable material which will not noticeably deform under operating conditions, and which, in order to hold wear to a minimum, has a low coefficient of friction with respect to the moving member, and which has good resistance to the corrosive action of any fluids with which they may be in contact. As to metallic materials, the babbit alloys, bronze or other copper base alloys are probably of most general application. Of the non-metallic materials, laminated phenolic fibre and hard rubber compounds are very useful. Obviously the invention is not limited to the use of any specific materials, and these should therefore be selected to suit the particular operating conditions in which the seal is employed in accordance with the general principles set forth above.

Figure 4 shows the application of a series of seals of the type shown in Figures 1 and 2 to a shaft or rod 51 in a fixed housing 53. The seals are preferably assembled on the shaft 51 when the latter is disposed in the housing, and are forced against a shoulder 55 at the bottom of bore 57, the convex peripheries of the cushion rings 10 facilitating this installation. Wiping rings 59 may be inserted between the ends of the seals and the packing glands 61, and the latter by its threaded connection 63 with the housing 53, applies longitudinal compressive forces to the seals. These forces are transmitted to the sealing rings 20 at their outer peripheries 22 and because of the convexity thereof include radial compressive components which tend to reduce the diameter of the inner periphery of the sealing rings. This reduction in diameter or compression of the ring 20 is of course facilitated by the split 28. Such compression of the sealing ring 20 also automatically occurs if fluid pressure is applied to the cushion rings 10, such pressure usually being present as the reason for using the seal. Because of this compression, the rings 20 grip the shaft more tightly and present increased resistance to leakage of fluid thereby. As fluid pressure decreases, compression of the rings 20 is also reduced to lower the frictional forces between them and the shaft 51. During periods of high pressure the shoulder 24 on the rings 20 acts to limit the radial flow of the cushion rings 10 so that excessive distortion thereof or blowouts are prevented. It is evident that because of the deformability of the rings 10 and the specially shaped engaging peripheries 22 of the rings 20 that the seals will provide bearing support for the shaft 51 in spite of non-axiality thereof and will apply forces thereto tending to return it to proper alignment. It will also be recognized that any non-axial shock loads applied to the shaft 51 will at least in part be absorbed by the cushion rings 10.

Figure 5 shows how seals in accordance with Figure 3 may be used with a piston or plunger 71 that is reciprocably mounted in a cylinder 73. In this case the inner cushion rings 30 are mounted in an annular groove 75 in the periphery of the plunger 71 and may, if desired, be spaced apart by spacing ring 77. Initial compression of the seal on assembly of the plunger 71 and the cylinder 73 causes the cushion rings 30 to force the sealing rings 40 into intimate engagement with the cylinder wall. This pressure is, as before, proportional to fluid pressure on the seals. Since the sealing rings 40 shown in Figure 5 have no shoulders, radial flow of the cushion rings 30 is limited by the cylinder walls.

It will be apparent that the seal functions in this application to provide a resilient, self-aligning bearing support to the piston or plunger 71 and to cushion shocks due to pressure or other causes. It is also apparent that the seals are burst-proof and cannot be blown out. By virtue of the specially shaped peripheries, the seal may be easily installed and after installation has a maximum area of surfaces in fluid-tight contact. The shoulders provided control the flow of the elastic member so that undue distortion does not occur at high pressures or eccentricities.

Other advantages and modifications of the invention will be apparent to those skilled in the art, and it is therefore not intended to limit the invention to the specific details and features described herein.

What is claimed is:

1. A combined seal and bearing comprising a rubber-like cushioning ring having a V-shaped groove opening into a periphery thereof and a longitudinally split sealing ring having bi-convex peripheral portion mating with said groove and an annular shoulder radially spaced slightly from said cushioning ring periphery when the cushioning ring is unstressed, the peripheral mating portion of said sealing ring being of lesser cross sectional area than the V-shaped groove when the elastic member is unstressed.

2. A combined seal and bearing comprising a rubber-like cushioning ring having a V-shaped groove opening into a periphery thereof and a longitudinally split sealing ring having bi-convex peripheral portion mating with said groove and an annular shoulder radially spaced slightly from said cushioning ring periphery when the cushioning ring is unstressed, the peripheral mating portion of said sealing ring being of lesser cross sectional area than the V-shaped groove when the elastic member is unstressed, and the other periphery of said cushioning ring being convex.

JOHN C. MONAHAN.

REFERENCES CITED

The following references are of record in the file of this patent:

UNITED STATES PATENTS

| Number | Name | Date |
| --- | --- | --- |
| 770,926 | Rhodes | Sept. 27, 1904 |
| 930,230 | Rhodes | Aug. 3, 1909 |
| 1,574,412 | Switzer | Feb. 23, 1926 |

FOREIGN PATENTS

| Number | Country | Date |
| --- | --- | --- |
| 7,328 | Great Britain | of 1892 |
| 122,089 | Great Britain | of 1919 |